No. 670,581. Patented Mar. 26, 1901.
C. ERISMAN.
TANK AND MEANS FOR DISCHARGING CONTENTS THEREOF.
(Application filed Jan. 5, 1901.)
(No Model.)
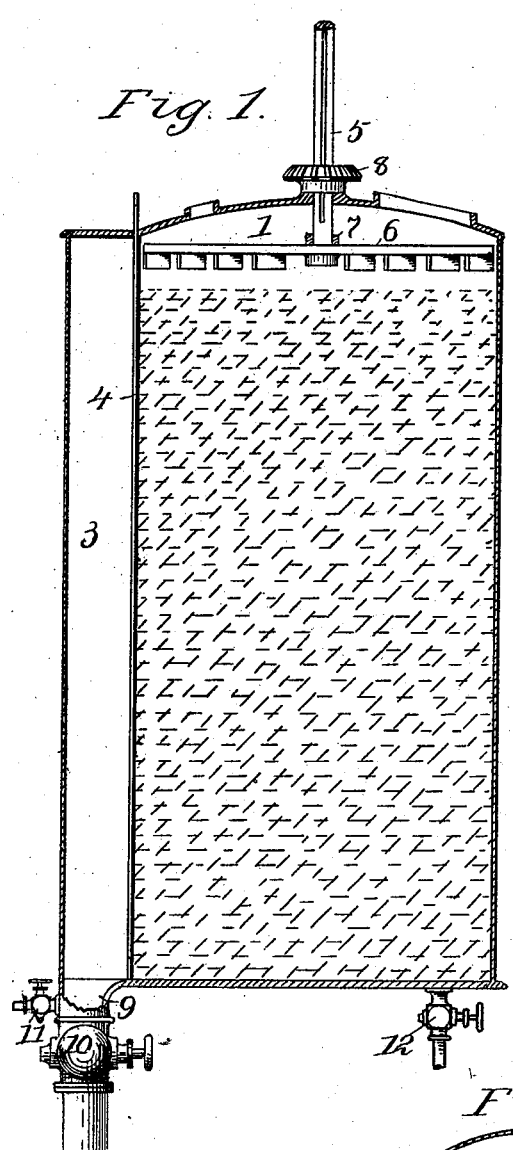
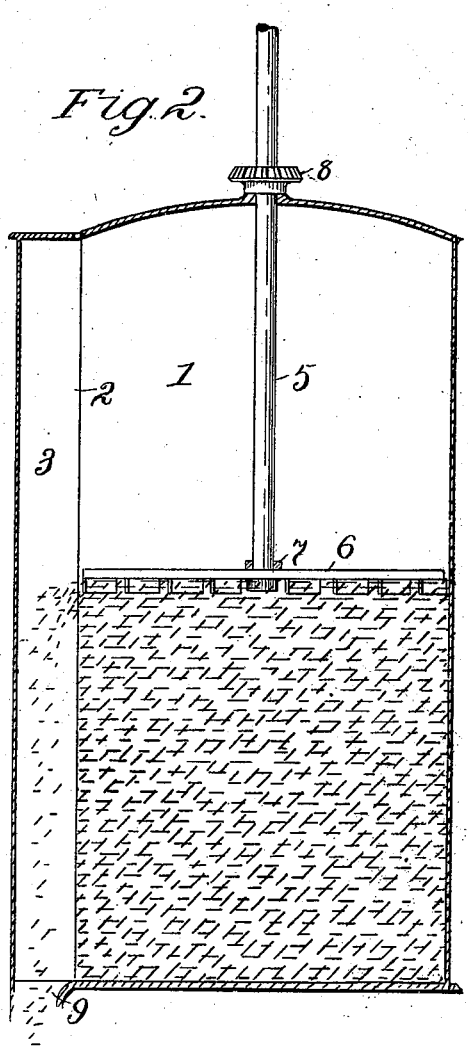
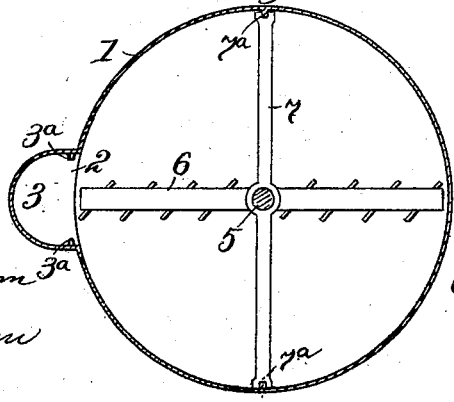
Witnesses,
Ina Graham
Nora Graham
Inventor,
Clem Erisman,
by L. P. Graham
his attorney.

UNITED STATES PATENT OFFICE.

CLEM ERISMAN, OF DECATUR, ILLINOIS, ASSIGNOR TO FRANK M. PRATT, OF SAME PLACE.

TANK AND MEANS FOR DISCHARGING CONTENTS THEREOF.

SPECIFICATION forming part of Letters Patent No. 670,581, dated March 26, 1901.

Application filed January 5, 1901. Serial No. 42,227. (No model.)

*To all whom it may concern:*

Be it known that I, CLEM ERISMAN, of the city of Decatur, county of Macon, and State of Illinois, have invented a certain new and useful Tank and Means for Discharging the Contents Thereof; and I hereby declare the following to be a full, clear, and exact description of the same.

This invention provides means for discharging a comminuted or divided and somewhat compacted mass from tanks and like receptacles, it being particularly applicable to meal from which the oil has been extracted by solvents. It is exemplified in the structure hereinafter described, and it is defined in the appended claims.

In the drawings forming part of this specification, Figure 1 is a central vertical section through a tank embodying my improvements, such tank being shown filled with meal or other mass having little fluidity. Fig. 2 is a central vertical section through the tank, showing the discharging mechanism in operation and representing the tank in the condition it maintains while the discharging operation is carried on. Fig. 3 is a horizontal cross-section through the tank above the discharging mechanism.

The tank is shown at 1, and it is preferably cylindrical in general outline, with an end of the cylinder for a base. An opening is made in a side of the tank, as shown at 2, and such opening extends vertically from the top of the tank to the bottom thereof or throughout so much of the tank as it is desired to operate the discharging mechanism. A closure is made for the opening in the side of the tank, and such closure preferably comprises a plate, as 4, which may be withdrawn from the tank through the top thereof. The discharging mechanism consists in this instance of a rotary arm or set of arms adapted to rest on or in the upper surface of the mass to be discharged and to descend with the mass as the discharging proceeds. A cross-arm having inclined discharging-blades is shown at 6. The shaft therefore is shown at 5, and a brace for the shaft is shown at 7; but the cross-arm is only typical or representative of the centrifugal discharger that constitutes an essential element of my invention. The cross-brace 7 is guided by ribs 7ª on the sides of the tank, as are shown in Fig. 3, and a wheel, as 8, may be used to turn shaft 5. Ribs 3ª, also shown in Fig. 3, provide supports for the closure-plate and hold the plate in position until it is desired to discharge the contents of the tank.

When it is desired to unload the tank, the plate 4 or other closure for the lateral opening 2 is removed or opened, the discharging mechanism is permitted to rest on and in the material to be discharged, and the mechanism is turned in a direction to give it a centrifugal action on the mass in the tank. Then as the material is forced from the center of the tank outward and is carried around the internal periphery of the tank it is gradually forced through opening 2. As the material in the tank is lowered by the continuous discharge through the lateral opening the discharging-arms descend and keep in operative contact with the upper part of the mass, and this continues until the tank is empty or until as much material is removed therefrom as it is desired to discharge. As the discharging mechanism descends the guide-arms 7 descend with it and hold it concentric with the body of the tank.

The foregoing description pertains to the bare idea of discharging the contents of tanks irrespective of previous treatment of the material in the tanks and of the subsequent disposal thereof.

In using the invention in connection with the extraction of oil from meal and the like by the use of solvents it is advisable to build a wall around the discharge-opening of the tank, so as to form an inclosure or compartment, as 3, separate from the body of the tank, into which the discharged material may fall and be confined or conveyed away. In this specific use of the invention the large valve 10 in the lower end of the compartment 3 is closed, as are also the oil and solvent cocks 11 and 12. The partition or closure plate 4 is set in position to separate the body of the tank from the compartment 3, and the meal is placed in the tank and subjected to the action of a solvent in any desired manner. Subsequently the cocks 12 and 11 are opened, the former to draw off the oil and solvent from the body of the tank and the latter to relieve compartment 3 of the oil and solvent that have passed the partition. Next the valve 10 is opened, the partition 4 is removed, and the discharging operation is performed in the manner hereinbefore described, the material forced off the column or mass in the tank falling through the compartment 3, as shown in Fig. 2.

I claim—

1. A tank having a vertical outlet-opening, a closure for the opening, and horizontally-acting discharge mechanism movable vertically in the tank, whereby the contents of the tank may be discharged through the opening by continuous sidewise displacement of the upper surface of the contents.

2. A tank having a vertical outlet-opening extending from its upper end to its lower end, a closure for the opening and horizontally-acting centrifugal discharge mechanism to force the upper surface of the contents toward the outlet-opening, such discharge mechanism being free to move downward as the contents are lowered.

3. A tank having a vertical outlet-opening extending from its top to its bottom, a closure for the opening, a rotatable and longitudinally-movable shaft extended through the upper end of the tank and a scraper-arm on the lower end of the shaft adapted to act horizontally on the upper surface of the contents of the tank and descend as the contents are removed.

4. A tank having an annex compartment on one of its sides extending downward from near the upper end of the tank, a removable partition separating the body of the tank from the annex, and horizontally-acting discharge mechanism having vertical motion in the tank, whereby the contents of the tank are discharged into the annex by continuous bodily transference of the upper surface, or layer, of such contents.

In testimony whereof I sign my name in the presence of two subscribing witnesses.

CLEM ERISMAN.

Witnesses:
F. M. PRATT,
CHAS. F. PRATT.